(12) United States Patent
Green et al.

(10) Patent No.: US 8,044,852 B2
(45) Date of Patent: Oct. 25, 2011

(54) POSITION DETERMINATION BASED ON HYBRID PSEUDORANGE SOLUTION DATA

(75) Inventors: Jim Green, Los Altos, CA (US); Shawn Weisenburger, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 210 days.

(21) Appl. No.: 12/353,449

(22) Filed: Jan. 14, 2009

(65) Prior Publication Data

US 2010/0176990 A1   Jul. 15, 2010

(51) Int. Cl.
*G01S 19/23* (2010.01)
*G01S 19/42* (2010.01)

(52) U.S. Cl. .............................. 342/357.62; 324/357.25

(58) Field of Classification Search ............. 342/357.25, 342/357.31, 357.46, 357.62; 701/213, 215
See application file for complete search history.

(56) References Cited

U.S. PATENT DOCUMENTS

| | | | |
|---|---|---|---|
| 5,323,163 A | 6/1994 | Maki | |
| 5,786,773 A * | 7/1998 | Murphy | ........................ 340/947 |
| 6,057,800 A | 5/2000 | Yang et al. | |
| 6,278,404 B1 | 8/2001 | Niles et al. | |
| 6,377,891 B1 | 4/2002 | Gilbert | |
| 6,430,416 B1 * | 8/2002 | Loomis | ...................... 455/456.1 |
| 6,430,504 B1 | 8/2002 | Gilbert et al. | |
| 6,580,390 B1 | 6/2003 | Hay | |
| 6,727,850 B2 | 4/2004 | Park et al. | |
| 6,810,324 B1 | 10/2004 | Nadkarni | |
| 6,825,805 B2 | 11/2004 | Rowitch | |
| 6,957,143 B1 | 10/2005 | Nadkarni | |
| 7,142,155 B2 | 11/2006 | Iwami | |
| 7,250,904 B2 | 7/2007 | King et al. | |
| 7,702,460 B2 * | 4/2010 | Liu et al. | ........................ 701/214 |
| 2010/0176990 A1 | 7/2010 | Green et al. | |

\* cited by examiner

*Primary Examiner* — Dao L Phan

(57) ABSTRACT

Embodiments provided herein recite methods and systems for position determination based on hybrid pseudorange solution data. In one embodiment, navigation satellite system (NSS) pseudorange data is received for high yield pseudoranges. In addition, NSS pseudorange data is received for high accuracy pseudoranges. The high accuracy pseudoranges and selected ones of the high yield pseudoranges utilized by a hybrid PVT processor to determine a hybrid NSS-based location solution.

30 Claims, 8 Drawing Sheets

500

```
┌─────────────┐
│    START    │
└──────┬──────┘
       ▼
┌─────────────────────────────────────────────────┐
│ RECEIVING NAVIGATION SATELLITE SYSTEM (NSS)     │
│ PSEUDORANGE DATA FOR HIGH ACCURACY PSEUDORANGES.│
│                      505                        │
└──────────────────────┬──────────────────────────┘
                       ▼
┌─────────────────────────────────────────────────┐
│   RECEIVING NSS PSEUDORANGE DATA FOR HIGH YIELD │
│                  PSEUDORANGES.                  │
│                      510                        │
└──────────────────────┬──────────────────────────┘
                       ▼
┌─────────────────────────────────────────────────┐
│ UTILIZING THE HIGH ACCURACY PSEUDORANGES AND    │
│ SELECTED ONES OF THE HIGH YIELD PSEUDORANGES IN │
│ A HYBRID PVT PROCESSOR TO DETERMINE A HYBRID    │
│ NSS-BASED LOCATION SOLUTION.                    │
│                      515                        │
└──────────────────────┬──────────────────────────┘
                       ▼
                ┌─────────────┐
                │     END     │
                └─────────────┘
```

POSITION DETERMINATION BASED ON HYBRID PSEUDORANGE SOLUTION DATA

TECHNICAL FIELD

Embodiments in accordance with the present invention generally pertain to navigation devices.

BACKGROUND

A Navigation satellite system (NSS) is a space based radio positioning network for providing users equipped with suitable receivers highly accurate position, velocity, and time (PVT) information. One of the most recognizable NSS systems is the global positioning system (GPS) developed by the United States of America, although there are numerous other systems including local NSS's that utilize fewer satellites in a geosynchronous orbit. Thus, although the following background describes the operation of the GPS system in particular, it is appreciated that the description is meant to provide a generic overview of NSS operations as opposed to specific reliance on a single NSS.

In general, the space based portion of GPS comprises a constellation of GPS satellites in non-geosynchronous 12-hour orbits around the earth. GPS satellites are located in six orbital planes with four of the GPS satellites in each plane, plus a number of "on orbit" spare satellites for redundancy. The orbital planes of the GPS satellites have an inclination of 55 degrees relative to the equator and an altitude of approximately 20,200 km (10,900 miles) and typically complete an orbit in approximately 12 hours. The positions of GPS satellites are such that a minimum of five of the total constellation of GPS satellites are normally observable (above the horizon) by a user anywhere on earth at any given time.

NSS position determination is based upon a concept referred to as time of flight (TOF) ranging. For example, each of the orbiting GPS satellites broadcasts spread spectrum microwave signals encoded with positioning data and satellite ephemeris information. Essentially, the signals are broadcast at precisely known times and at precisely known intervals. The signals are encoded with their precise time of transmission.

The signal is received at a NSS receiver designed to determine the time of flight from satellite to receiver by synchronizing a local replica of the satellite signal and determining the time of flight of this signal, compare it to the time of transmission, and to demodulate the satellite orbital data contained in the Satellite Data Message. The coded satellite signal contains information describing when the signal was sent from the satellite. The NSS receiver determines the time between transmission of the signal by the satellite and reception by the receiver. Multiplying this by the speed of light gives what is termed the pseudorange measurement of that satellite. It is called a pseudorange because of the many kinds of errors that occur due to clock errors, propagation errors, multipath errors, and the like.

If the NSS receiver clock were perfect, this would be the range measurement for that satellite, but the imperfection of the clock causes it to differ by the time offset between actual time and receiver time. Thus, the measurement is called a pseudorange, rather than a range. However, the time offset is common to the pseudorange measurements of all the satellites. By determining the pseudoranges of four or more satellites, the NSS receiver is able to determine its location in three dimensions, as well the time offset. In addition, because the signal is consistently generated and broadcast, the NSS receiver is able to determine position, velocity, and time (PVT) information on an ongoing basis thereby allowing navigation from point to point.

SUMMARY OF THE INVENTION

Embodiments provided herein recite methods and systems for pseudorange data hybridization. In one embodiment, navigation satellite system (NSS) pseudorange data is received for high yield pseudoranges. In addition, NSS pseudorange data is received for high accuracy pseudoranges. The high accuracy pseudoranges and selected ones of the high yield pseudoranges are then utilized by a hybrid PVT processor to determine a hybrid NSS-based location solution, where the accuracy can span a range, thus providing the user with useable position fixes under less than ideal operating conditions.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a flow chart of a method for position determination based on hybrid pseudorange solution data in accordance with one embodiment of the present invention.

DESCRIPTION OF EMBODIMENTS

Figure 1:
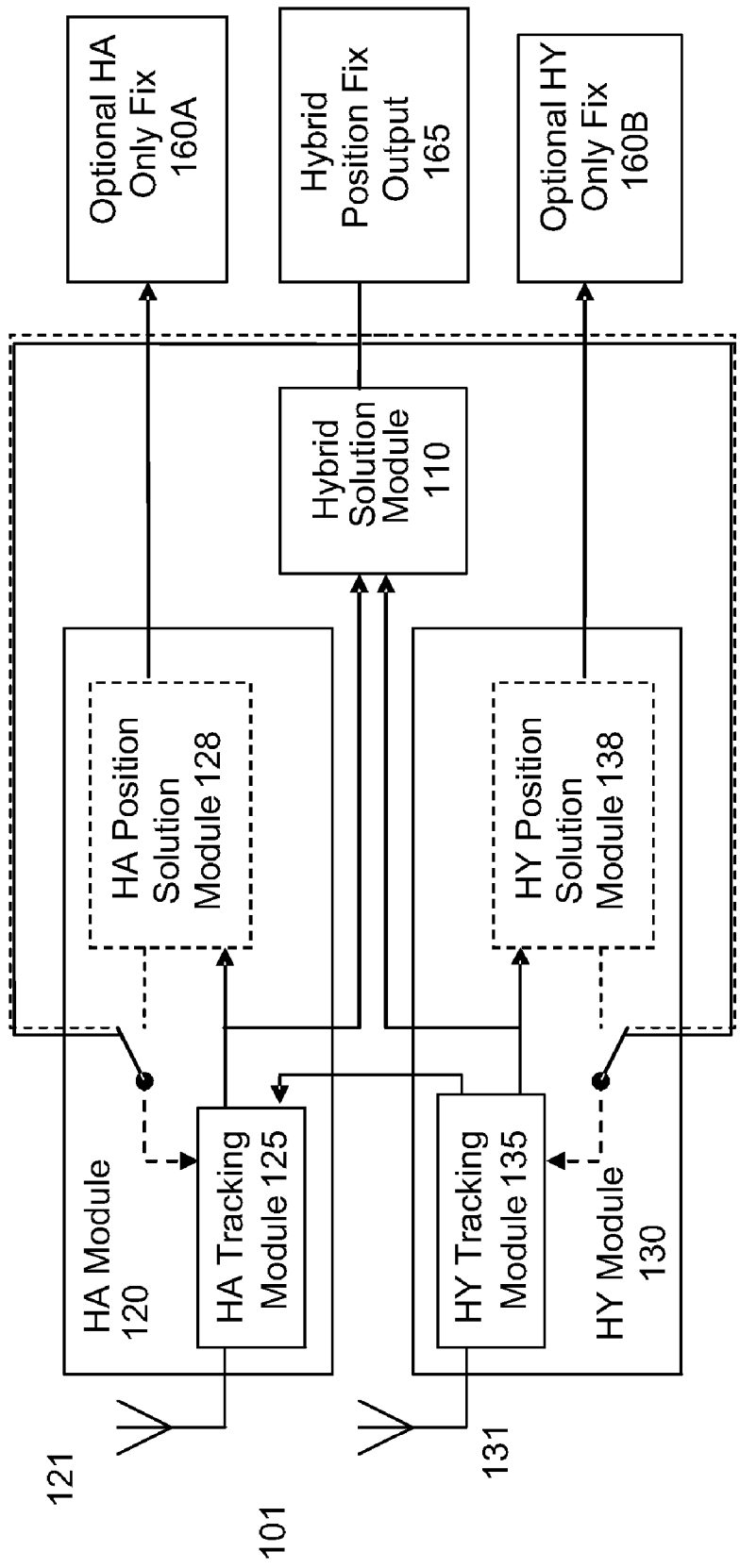
FIG. 1 is a block diagram of a dual antenna dual receiver NSS pseudorange combiner in accordance with an embodiment of the present invention.

Reference will now be made in detail to embodiments of the invention. While the invention will be described in conjunction with the different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the embodiments in accordance with the present invention, numerous specific details are set forth in order to provide a thorough understanding of the embodiments of the present invention. However, the embodiments in accordance with the present invention may be practiced without these specific details. In other instances, well-known methods, procedures, components, and circuits have not been described in detail so as not to unnecessarily obscure aspects of the embodiments in accordance with the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the embodiments in accordance with the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments of the invention relate to GPS Receiver Patents Showing General Functionality as described in detail in U.S. Pat. No. 4,847,862 issued Jul. 11, 1989 and which is assigned to the assignee of the present application, and in U.S. Pat. No. 5,486,834 issued Jan. 23, 1996 which is assigned to the assignee of the present application, and in U.S. Pat. No. 5,621,416 issued Apr. 15, 1997 which is assigned to the assignee of the present application and which is incorporated by reference for all purposes.

Overview

As described herein, navigation satellite system (NSS) refers to a position determining system that utilizes satellite-based position determining components or possibly a variety of terrestrial-based and satellite-based position determining components to determine a geographic position. In one embodiment, the geographic position provided by the NSS describes the latitude and longitude at the receiving device's location. However, NSS's may also be used to determine elevation, speed, time, and the like. In some cases, the navigation satellite systems are global (e.g., GNSS), however, there are also NSS's that are local (e.g., LNSS). In other words, while NSS's such as global positioning system (GPS) provide global navigation, there are also numerous other satellite systems, that provide only local or fixed location signals. The present technology is well suited for use in GNSS environments, LNSS environments or a combination thereof.

In different embodiments, NSS receivers operate by receiving radio signals provided by any of the group of local and global NSS signal providers including, but not limited to, a GPS signal, a Galileo signal, a Globalnaya Navigatsionnay Sputnikovaya Sistema (GLONASS) signal, the Indian Regional Navigational Satellite System (IRNSS), and a Compass signal. For example, in one embodiment, the satellite navigation signal 101 being received may be, but is not meant to be limited to, L1 signal, E1 signal, E2 signal, L2 signal, L3 signal, E6 signal, B3 signal, LEX signal, L5 signal, and an E5 signal. Furthermore, although signal 101 may be from a satellite based device, the signal may be a signal generated by a device placed in line of sight. In addition to satellite-based positioning signals, an Earth based signal generator often referred to as a pseudolite transmitter, may be used to distribute the previously described signal 101, particularly in areas where visibility of satellites is obscured such as in deep open-pit mines. The Earth based pseudolite signal generator may be portable or stationary.

For purposes of the present discussion, navigation satellite system (NSS) receivers are separated into two basic categories, standard or high yield (HY) receivers and precise or high accuracy (HA) receivers. Generally, a HY receiver (also referred to herein as an HY module) refers to an NSS receiver configured to achieve the highest possible yield with a willingness to give up accuracy if required to achieve the high yield. In contrast, an HA receiver (or HA module) refers to a receiver configured to provide a position solution within a defined level of accuracy with a willingness to give up yield to ensure that all positions reported are of the defined level of accuracy; for example, NSS signals from low-elevation satellites may be excluded because their signal-to-noise ratio is unacceptably low, resulting in noisier signals, which in turn produce pseudoranges with larger variations then desired. An elevation mask is typically applied to exclude satellite signals which are below a specified elevation angle at the receiver.

High yield receivers often do not apply such exclusionary masks, and so provide pseudoranges with greater statistical variations. In other words, there is a tradeoff between yield and accuracy. A HY receiver is normally designed and configured to obtain high yield, and as a result may often give up accuracy, and a HA receiver is designed and configured to obtain high accuracy, which often comes at the expense of yield, depending on the observability of satellites by the receiver. For a variety of reasons, HY receivers are generally less expensive to produce than HA receivers, most notably because of much higher volume of production for HY receivers.

Therefore, there are times when the HY receiver will be able to achieve a position fix solution when the HA receiver cannot. For example, based on accuracy requirements and filtering, the HA receiver may not be able to determine a useable pseudorange from a given satellite, or group of satellites, and therefore will not be able to output a position fix solution. However, by utilizing selected pseudorange data from the HY receiver with that of the pseudorange data at the HA receiver, a number of possible advantages may be realized.

For example, by utilizing HY pseudorange data in conjunction with HA pseudorange data, it is possible to obtain a sufficiently accurate hybrid position fix where no solution was possible with only HA pseudoranges. The function of selecting at least one of a HY pseudorange, and using it when the corresponding HA pseudorange is unavailable, in a specially configured position determination module, processing the combination of HA and HY pseudoranges, and delivering a position fix, is referred to herein as "a hybrid pseudorange solution." The hierarchy of the hybrid pseudorange solution starts with seeking HA pseudoranges, and when not enough are found to generate a position fix, performing HY pseudorange augmentation as necessary to get a sufficiently accurate position fix, including going to the extreme of using only HY pseudoranges when no suitable HA pseudoranges are available. If the resulting fix does not meet the accuracy requirements as specified by the user, it is discarded.

One example of a GPS chipset upon which embodiments of the present technology may be implemented is the Maxwell VI™ chipset which is commercially available from Trimble® Navigation of Sunnyvale, Calif., 94085. Another is the Copernicus chipset, also manufactured by Trimble Navigation Limited. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112.

Operation

With reference now to FIG. 1, a block diagram of a NSS pseudorange hybrid solution module 110 having two separate antennae (e.g., HA antenna 121 and HY antenna 131) configuration for HY and HA acquisition is shown in accordance with one embodiment of the present invention. In other words, system 110 includes an HA module 120 for processing positioning signal 101 and a HY module 130 for processing the same positioning signal 101. In general, antennas 121 and 131 may be any type of antenna capable of receiving an NSS signal at the frequencies such signals are transmitted.

In one embodiment, HA module 120 and HY module 130 each have their own tracking engines 125 and 135 respectively, with optional positioning engines 128 and 138 respectively, that deal exclusively with the measurements generated by its own tracking module. For example, HA position solution module 128 utilizes only measurement information provided by HA tracking module 125, while HY position solution module 138 will utilize only measurement information provided by HY tracking module 135.

Additionally, the pseudorange measurements are also sent from both HA tracking module 125 and HY tracking module 135 to a hybrid solution module 110. This module computes the hybrid position fix output 165 which may be a "best available" solution based on the input measurements. At an extreme, it may be exactly the same as the HA only fix 160A or HY only fix 160B, or it could be a hybrid solution which uses measurements from both HA tracking module 125 and HY tracking module 135.

In one embodiment, the hybrid position may be optionally fed back to the HA and HY tracking modules. This feedback may be used to assist HA module 120 in (re)acquisition. In contrast, any or all measurements from the HY module 130 may be used by the HA module 120 to assist in (re)acquisition. For purposes of clarity in the diagram, dashed lines/boxes represent optional modules. In one embodiment, the signal acquisition aiding data may include any of a code phase, Doppler information, timing information, signal acquisition data, position data and velocity data that HY can pass to HA for acquiring or re-acquiring a particular satellite signal.

Although, in one embodiment, each of the HA module 120 and the HY module 130 may have their own radio frequency (RF) down converters, digital signal processing (DSP) engines, and communications protocols and devices (e.g., ports, timing, and the like). However, in another embodiment, the HA module 120 and the HY module 130 may share any, a combination of, or all NSS components such as the radio frequency (RF) down converter, the digital signal processing (DSP) engine, the communications protocols and devices (e.g., ports, timing), and the like.

Acquisition

In order to track a satellite signal, a GNSS needs to search frequency (doppler) and time (code). The frequency of a given measurement is a function of the antenna velocity, the satellite velocity (combined that makes the doppler) and the receiver frequency error. If the GNSS has no idea where it is and/or where the satellite is along with their velocities, a search over the entire possible doppler range must occur. On top of this, if the GNSS does not know the approximate receiver clock drift (frequency error), the entire possible frequency error must be added to the possible doppler error to create the search range.

However, by knowing the approximate position and velocity, approximate doppler to the satellite can be computed. This can significantly reduce the doppler search space. On top of that, if frequency information can be transferred, this can help reduce the search space due to the receiver clock drift. In one embodiment, the transfer of frequency information could be achieved using the pseudorange measurement output from the HY receiver. Additionally, if a reasonably good crystal is used, the clock drift can be kept reasonably small.

In order to track the code, one must know the pseudorange. Pseudorange is a combination of the true range plus the receiver clock bias (plus a few other small errors). So, knowing an approximate position and time helps compute an approximate range to the satellite. This can also reduce the search space considerably. For example, given a single pseudorange measurement in combination with an approximate position, the approximate receiver clock error can be computed, giving fairly precise time. Any precise timing information can be used to skip steps in the signal alignment. For example, if time is known better than 0.5 ms, bit synchronization can be skipped. If time is known better than 10 ms, word synchronization can be skipped, etc. Thus, given pseudorange and doppler measurements along with PVT information, both the time and frequency search spaces can be significantly reduced.

Errors

Broadly speaking, errors in the position provided by a GNSS receiver are due to two factors: the precision with which the distance to each satellite is known, and the geometry of the satellites, e.g., how closely or far apart they're spaced across the sky. Distance errors can be compensated for by using WAAS, post-processing, averaging, and other techniques, but satellite geometry is a fundamental limiting factor. The maximum achievable position accuracy is limited by GPS satellite geometry.

The GPS satellite geometry factor is sometimes represented by a numerical measure known as "Position Dilution of Precision", or PDOP. The higher the PDOP, the greater the possible error in the accuracy of your position; roughly speaking, your total error is the error due to the uncertainty in satellite distance multiplied by the PDOP Approximate user location and approximate satellite locations at a given epoch are needed to compute PDOP. As stated herein, PDOP is essentially a measure of the geometric strength of the network of satellites for a given user location. For example, if all of the satellites (relative to a user at a given point in time) are lined up in the north/south azimuth with little variation from this line, the ability to solve the user's position in the north/south direction is quite strong, but the ability to solve the user's position in the east/west direction is weak. This would result in a large PDOP. If the satellites were distributed more evenly throughout the sky, the PDOP would be low indicating geometric strength and the ability to solve for the user's position in all directions.

PDOP calculations are known in the arts and are routinely calculated in current GNSS receivers. See Misra & Enge, Global Positioning System, Second Edition, p. 208 ff, Ganga-Jamuna Press, 2006, ISBN 0-9709544-1-7.

Normally, PDOP calculations are accompanied by a signal to noise ratio (SNR). Typically, SNR is provided in units of dBHz (dB in a 1 Hz bandwidth). For example, in one embodiment, threshold acquisition for the HA module 120 may be at or around 27 dB-Hz while the tracking threshold is approximately 20 dB-Hz. Therefore, in the present Example, the HA module 120 would discard any pseudorange with an SNR less than 22 dB-Hz. At the same time, the HY module 130 would continue to utilize a pseudorange with an SNR below the 22 dB-Hz threshold to generate or attempt to generate a position fix.

With reference still to FIG. 1, an example of an attempted GNSS satellite signal acquisition is described. In one embodiment, the attempt to acquire may be from a cold start (e.g., no initialization), a warm start (e.g., approx. 50% initialization), or a hot start (e.g., approximately 95% initialization). As stated herein, acquisition by the receivers refers to synchronizing a local code phase generator with the code phase of a given satellite signal, thus tracking the code phase, and optionally synchronizing another local oscillator with the carrier phase, and demodulating the satellite data message from a pseudorandom-noise (PRN) code. Synchronization of the code phase allows for further synchronizing of the local clock signal in the receiver.

Comparing the local clock time of synchronization to the transmitted time provides the time of flight of the signal from the satellite to the receiver, which in turn provides the pseudorange for that satellite at that instant of time. This pseudorange is then delivered to a position, velocity, and time (PVT) processor such as 128, along with other pseudoranges measured from other satellites in view of the receiver, and processed by the PVT processor to deliver a location solution with position, velocity, and time as an output of the receiver, or PVT data 160. This kind of processing of pseudoranges to obtain a position fix is well-known in the global positioning arts since its introduction in 1972.

In general, the degree of the receiver's readiness to capture and process GNSS signals, commonly referred to as the "starting temperature" (e.g., cold, warm, or hot) may be functions of how recently HA module 120 and/or HY module 130 has been used. For example, if the last use was in the same general area and occurred in the last few minutes, as the present use, then the acquisition time may be much shorter than for a HA module 120 and/or HY module 130 that has not been utilized in the same area or within the same time frame.

Figure 2:
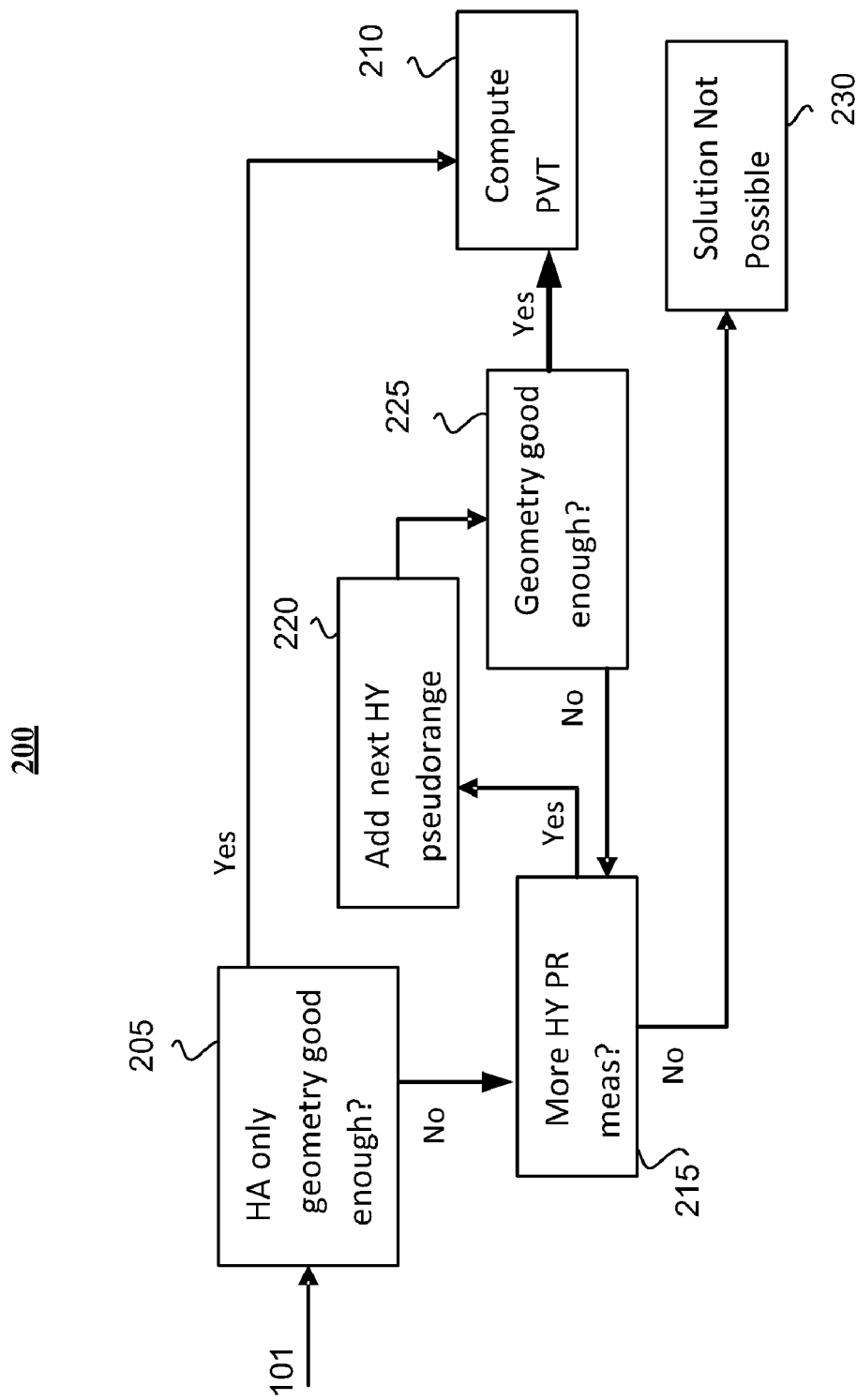
FIG. 2 is a flow chart of a NSS pseudorange hybrid solution module in accordance with an embodiment of the present invention.
Figure 3:
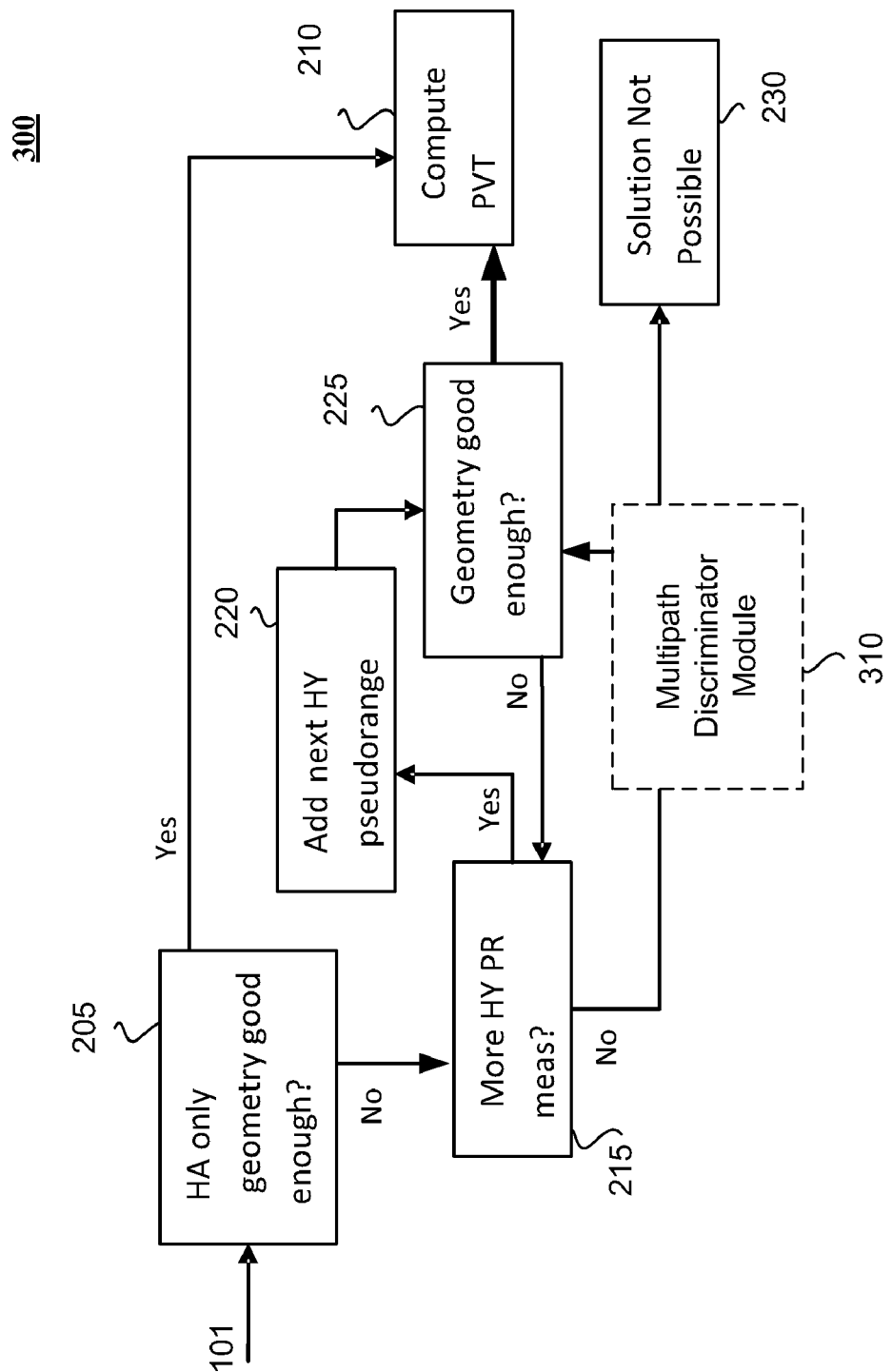
FIG. 3 is a flow chart of a method for determining how to combine HY and HA pseudoranges in a pseudorange hybrid solution module in accordance with one embodiment of the present invention.

Referring now to flowchart 200 of FIG. 2, one embodiment of the operation of the hybrid module is shown. For purposes of clarity, the initial description of FIGS. 2 and 3 are meant to provide a high level view of the components and aspects of one or more embodiments of the present technology. Further detail and examples will then be provided with respect to flowchart 500.

In one embodiment, a signal 101 is received. Depending on the operating environment the receiver system is located in, HA module 120 and/or HY module 130 may or may not successfully generate pseudorange data from signal 101. For example, if the receiver is in a city, under heavy brush, in a valley, or otherwise has an impeded view of the sky, pseudorange data, including high accuracy and high yield pseudorange data may be limited. Although a number of conditions are stated, it should be understood that the stated conditions are exemplary and that there may be numerous other conditions, variations or combinations which would deleteriously affect the acquisition of both high accuracy and high yield pseudorange data.

At 205, a first check is performed to establish whether or not enough HA measurements are available to form a solution that has geometry that is better than a threshold (for example PDOP<10). At 210, if there are enough HA measurements to satisfy this criteria, an HA only fix 160A solution is generated. However, at 215, if there are not enough HA measurements to satisfy these criteria, the hybrid solution module 110 begins adding HY measurements to the partial HA solution. In one embodiment, at 220 the ordering of HY measurements to be added could be from highest SNR to lowest SNR. In an alternative ordering for adding HY measurements, HY measurement that result in the greatest increase in geometric strength to the hybrid fix output 165 solution are provided first and continue to be provided until the geometry is good enough or a solution is not possible. In another embodiment, another metric may be used to define the order the HY measurements to be added.

For example, estimating the order of application of HY pseudorange measurements may include calculating a dilution of precision (DOP) for NSS satellites corresponding to the HY pseudorange measurements. Then, the estimating of the geometry accuracy may be calculated based on the DOP and the estimated pseudorange accuracies for the pseudorange set. In another embodiment, estimating the geometric pseudorange accuracy may include, at least in part, a signal-to-noise ratio for a NSS signal corresponding to the high yield pseudorange. In yet another embodiment, estimating the geometric pseudorange accuracy may include, at least in part, an elevation angle for an NSS satellite corresponding to the high yield pseudorange. In a further embodiment, estimating the geometric pseudorange accuracy may include, at least in part, a length of time tracking a NSS signal corresponding to the high yield pseudorange.

In one embodiment, at 225 the HY measurements are added one at a time until the geometry criteria is achieved or no solution is possible. If the geometry criterion is reached, the hybrid fix output 165 solution is generated 210. At 230, if the geometry criterion is not met then no solution is possible. In another embodiment, the HY measurements may be added two or more at a time until the geometry criteria is achieved or no solution is possible.

For example, the pseudorange conditions are detected by the Hybrid solution module, and processed according the categories defined previously herein. In other words, how the hybrid solution module processes pseudoranges from HA, decides if the HA pseudoranges are adequate or not, and substitutes HY pseudoranges according to the dilution of precision metric. Other possible substitution metrics are also possible. For example, a substitution rule comprising the following steps: count the number of acceptable HA pseudoranges; if the number of acceptable pseudoranges is less than the number of pseudoranges that can be processed in the position determination module, select the number of HY pseudoranges that fills up the available processing capability. Twelve channel processing is commonly available in many receivers, so the position determination module often can accept 12 pseudorange inputs. Other channel capacities are used, such as eight.

For example, while HY tracking module 135 may not be able to output a complete set of pseudorange data 144, any amount of pseudorange data 144 generated by HY tracking module 135 will be provided to hybrid solution module 110, up to the processor's limit. In addition, hybrid solution module 110 also receives pseudorange data from HY position solution module 138. Thus, although HA module 120 is unable to generate an HA location solution 160A, it is possible that hybrid solution module 110 will be able to utilize the pseudorange data generated by HA module 120 in conjunction with the pseudorange data generated by HY module 130 to generate a hybrid position fix output 165 that at least achieves the HA module 120's PVT solution accuracy minimum.

However, it is also possible that no solution will be provided if the geometry does not meet the prerequisite criteria and there are no further HY pseudorange measurements to add. In another embodiment, no solution may be possible if the present geometry does not meet the prerequisite criteria and any remaining HY pseudorange measurements would not improve the geometry.

In yet another embodiment, if neither the HY module 130 nor the HA module 120 had any success generating pseudorange solutions, then the system returns to 205 after outputting solution not possible 230. That is, both modules continue trying to acquire, track, and produce a pseudorange from signal 101, and position solutions from any or all of the available pseudoranges. This may go on for a pre-designated period of time, or until the receivers are turned off. Under this condition, an output signal label may be displayed indicating no position fix available.

With reference now to FIG. 3, a flowchart 300 illustrating one embodiment of a hybrid module including a multipath discriminator module is shown. For purposes of clarity, the description of items within flowchart 300 that are similar to those of flowchart 200 are not repeated herein. Instead, the discussion will focus on the multipath discriminator module 310. In one embodiment, multipath discriminator module 310 is located between 215 and solution not possible 230. In another embodiment, multipath discriminator module 310 may be utilized prior to 215, after 215 or at another location in the hybrid solution path.

In general, multipath discriminator module 310 is used to recognize and then remove or deweight poorly correlated pseudoranges from the solution set as a means to increase the geometry of the solution. For example, in one embodiment multipath discriminator module 310 detects which satellite vehicles (SVs) may have multipath and then does not allow them to be used in the solution. Thus, in one embodiment, multipath discriminator module 310 may not attempt to correct the Multipath, but instead to find the SVs with Multipath and then not use them in the PVT solution. In another embodiment, multipath discriminator module 310 detects which satellite vehicles (SVs) may have multipath and then deweights them while still allowing them to be used in the solution.

Figure 4:
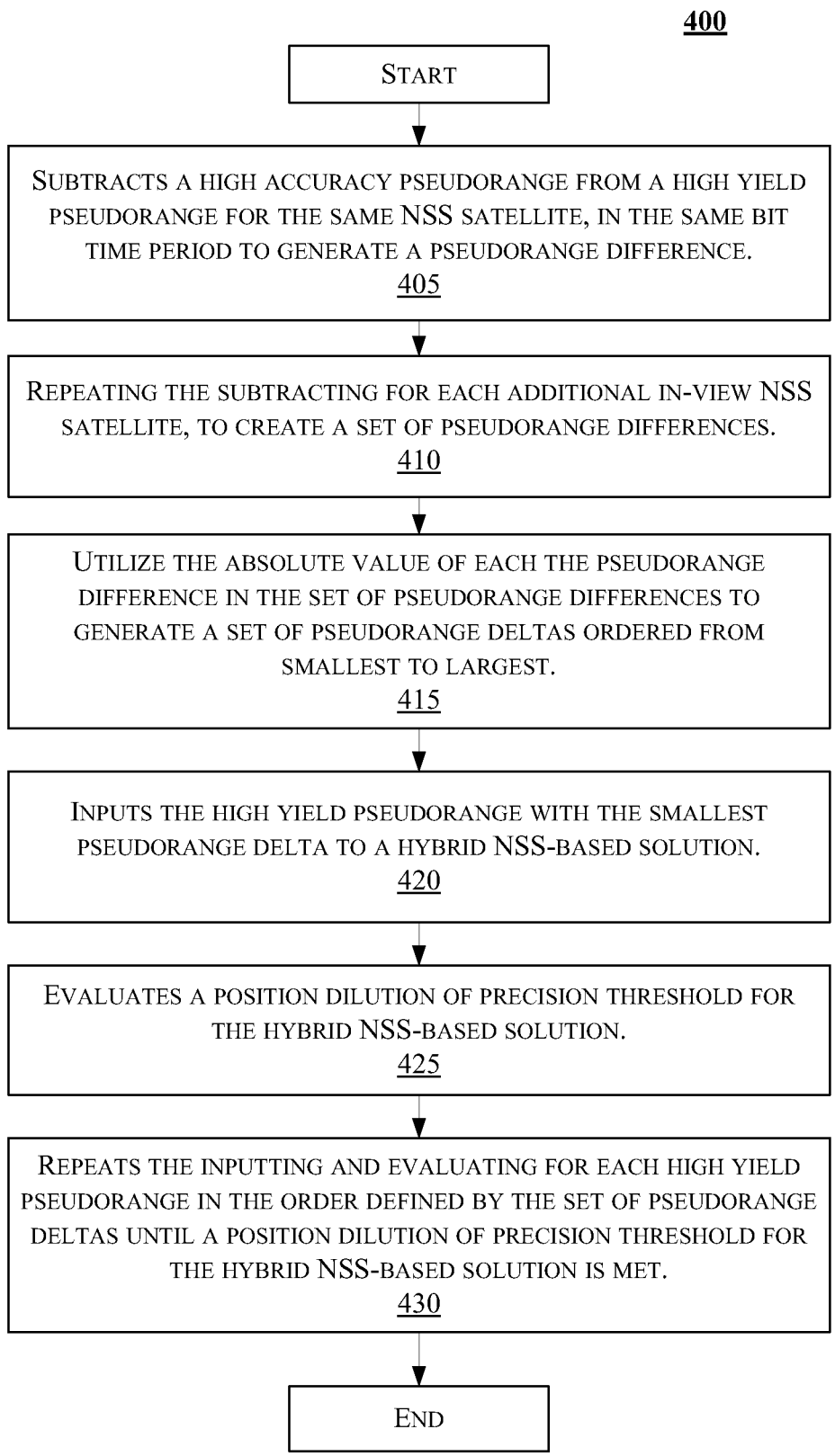
FIG. 4 is a flow chart of a method for utilizing pseudorange differences for position determination based on hybrid pseudorange solution data in accordance with one embodiment of the present invention.

With reference still to FIG. 3 and now to FIG. 4, a flowchart of a method for utilizing pseudorange differences for position determination based on hybrid pseudorange solution data is shown in accordance with one embodiment of the present invention.

In one embodiment multipath discriminator module 310 may examine all SVs that are being tracked by both the HA module 120 and the HY module 130.

At 405, multipath discriminator module 310 subtracts the high accuracy pseudorange from the high yield pseudorange for the same NSS satellite; in the same bit time period to generate a pseudorange difference. At 410, multipath discriminator module 310 repeats the subtracting for each additional in-view NSS satellite, to create a set of pseudorange differences.

For example, multipath discriminator module 310 calculates the pseudorange difference for each of these SVs using an equation such as:

$$\text{Delta } p = ABS(\text{HA}(p) - \text{HY}(p))$$

Where Delta p is equal to the absolute value of the high accuracy pseudorange measurement minus the high yield pseudorange measurement for the same satellite signal.

At 415, multipath discriminator module 310 utilizes the absolute value of each the pseudorange difference in the set of pseudorange differences to generate a set of pseudorange deltas ordered from smallest to largest. In other words, in one embodiment, once the Delta p's are generated they are organized, such as in a ranking, from pseudoranges having the smallest Delta p to largest Delta p.

At 420, the high yield pseudorange with the smallest pseudorange delta is input to the hybrid NSS-based solution. At 425, one embodiment evaluates the PDOP threshold for the hybrid NSS-based solution. At 430, one embodiment repeats the inputting and evaluating for each high yield pseudorange in the order defined by the set of pseudorange deltas until a position dilution of precision threshold for the hybrid NSS-based solution is met.

In other words, the PVT solution is formed favoring the SVs with the smaller Delta p's. For example, the pseudorange measurements starting with the smallest Delta P are each individually added to the hybrid solution until either a solution with a good enough geometry is formed or no solution is possible. In another embodiment, the basic methodology is expanded to use weights (such as bias filter description herein), or the like to provide the order to which the HY pseudorange measurements are added to the PVT solution.

Referring now to FIG. 5 and also to FIG. 2, a flowchart 500 of a method for HY and HA pseudorange hybrid position solution is shown in accordance with one embodiment of the present invention. In general, flowchart 500 in combination with flowchart 200 illustrates one embodiment of the actions taken for the variety of conditions of pseudorange availability, and resulting location solution accuracy. In general, embodiments of the present invention allow a user to obtain location solutions with varying degrees of accuracy, particularly when high accuracy location solutions are not available.

In one embodiment, the minimum level of accuracy of the location solution 160 is user definable. In another embodiment, a notification may be provided whenever the NSS pseudorange hybrid 110 is providing a hybrid position fix output below a pre-defined level of accuracy. In other words, the hybrid position fix output may be accompanied by a label defining the degree of accuracy, selected from a group comprising: High Accuracy, User Specified Accuracy, Basic Accuracy, or No Output, or any such range of accuracy definition as may be desired with any label chosen to represent these variable accuracies. The label may be displayed or appended to a stored position fix.

With reference now to 505 of FIG. 5 and to FIG. 2, one embodiment receives NSS pseudorange data for high accuracy pseudoranges. As shown in 205, in one embodiment if HA module 120 has successfully generated a high accuracy pseudorange solution, the high accuracy pseudorange solution is used to compute PVT 210. In so doing, NSS device 100 will be operating within the designed accuracy parameters of HA module 120.

With reference now to 510 of FIG. 5 and to FIG. 2, one embodiment receives NSS pseudorange data for high yield pseudoranges. In one embodiment, even when HA module 120 has successfully generated a PVT solution, pseudorange data from HA module 120 may be provided to hybrid solution module 110. In addition, in one embodiment, any pseudorange data from HY position solution module 138 may also be provided to hybrid solution module 110.

Further, in one embodiment, the hybrid position information from hybrid solution module 110 may be optionally fed back to the HA and HY tracking modules. This feedback may be used to assist HA module 120 in (re)acquisition. In one embodiment, the signal acquisition aiding data may include any of a code phase, Doppler information, timing information, signal acquisition data, position data and velocity data that HY can pass to HA for acquiring or re-acquiring a particular satellite signal.

In one embodiment NSS satellite signal having higher signal-to-noise ratios may be used when determining the high accuracy pseudoranges. In addition, when determining the high accuracy pseudorange, NSS satellites having elevation angles below an elevation threshold may be de-weighted. That is, although the original HA module 120 may discard a measurement because of the low elevation, the hybrid module 110 may choose to keep the measurement, but deweight it by methods such as the utilization of a bias filter described herein.

In general, the deweighting process is the process of choosing a measurement variance (inversely proportional to the weight). In other words, since the low elevation measurement is more affected by the atmosphere and more likely to have multipath errors, its measurement variance should be larger than those of higher elevation. These measurement variances (weights) are then used by the estimation process (least squares of Kalman filter) to estimate the PVT solution along with error estimates. One embodiment of the deweighting process is described in the bias filter section herein.

In one embodiment, the pseudorange data determined by the high yield technique may be provided to the high accuracy technique such as those described herein with respect to FIGS. 1-3 to assist the high accuracy technique in determining the high accuracy pseudorange.

At 515, the high accuracy pseudoranges and selected ones of the high yield pseudoranges are utilized in hybrid solution module 110 to determine a hybrid NSS-based location solution.

In other words, as described herein with respect to FIGS. 2 and 3, in one embodiment, when HA pseudorange geometry is not good enough pseudorange data from both HA module 120 and HY module 130 are utilized in an attempt to determine a usable hybrid position fix output 165.

For example, Table 1 below provides an example of the possible HA and HY measurements and the resultant PVT solution.

TABLE 1

| # HA meas | # HY meas | Action |
|---|---|---|
| >=4 (good PDOP) | any | HA only position fix |
| >=4 (poor PDOP) | >0 | Add HY measurements until PDOP < threshold or error estimate < threshold |
| <4 | >0 | Add HY measurements until PDOP < threshold or error estimate < threshold |
| 0 | >=4 | HY only solution |

In the example provided in Table 1, and described in combination with FIGS. 1 and 2, four possible situations are shown.

In the first situation, HA module 120 has 4 or more pseudorange measurements with good PDOP. Therefore, the number of HY module 130 pseudorange measurements is not of primary importance, although they may be being stored or observed by hybrid solution module 110 in case of future need. Thus, as shown in 205, since the HA only geometry is good enough, the HA PVT is computed at 210. That is, the resultant position fix is an HA only fix 160A.

In the second situation, e.g., when HA module 120 has 4 or more pseudorange measurements but poor PDOP and in the third situation when HA module 120 has less than 4 pseudorange measurements; 210 is not able to be initially performed and an HA only fix 160A is not generated. Instead, at 215, HY pseudorange measurements are received and at 220 an HY pseudorange measurement is added to the HA solution.

As described herein, the HY pseudorange measurements may be added one at a time and may be ranked based on their effect on the PDOP, or other characteristics. For purposes of clarity, the present example will utilize PDOP ranking. In one embodiment, once a HY pseudorange measurement is added to the hybrid solution, 225 evaluates the solution geometry. If the addition of the HY pseudorange measurement appears to have increased the accuracy of the hybrid solution to a level at or above the threshold, then the hybrid solution is passed to 210 and PVT is computed.

However, if the addition of the HY pseudorange measurement does not increase the accuracy of the hybrid solution to a level at or above the accuracy threshold, then the hybrid solution module 110 loops back to 215 and selects the next highest ranked HY pseudorange measurement. In one embodiment, this loop may continue until all HY pseudorange measurements are depleted, until it is recognized that any remaining HY pseudorange measurements will not achieve the solution geometry, or until a good enough geometry is achieved.

For example, if it becomes clear that adding any of the remaining HY pseudorange measurements to the hybrid solution would not be enough to achieve the level of accuracy of the hybrid solution, the hybrid loop may stop and solution not possible 230 would be reached. In one embodiment, the solution not possible result would remain until something changed, e.g., a new pseudorange, a change in PDOP, or the like.

In one embodiment, while performing the 215-225 loop, any changes to the HA pseudorange measurements such as new pseudorange measurements or PDOP updates for present measurements may also be incorporated. Thus, a change in NSS receiver position, change in satellite location over time, or the like may result in PVT computation. Further, as described herein, multipath discriminator module 310 of FIG. 3 may be utilized to check for and potentially remove or deweight any multipath pseudorange measurements being utilized by the hybrid solution. In another embodiment, multipath discriminator module 310 may be utilized prior to 215 or other locations within loop 215-225 thereby providing earlier multipath recognition.

In another embodiment, the process is repeated until an acceptable accuracy threshold is met. In yet another embodiment, the loop is repeated a fixed number of times. In a further embodiment, the loop is repeated for a fixed period of time. Moreover, in another embodiment the loop may be repeated intermittently.

In the final example, no HA pseudorange measurements are received and only HY pseudorange measurements are provided. In that case, the solution will either be declared not possible 230, or optionally an HY only fix 160B may be provided.

Due to the numerous possible accuracy options when providing the PVT solution 210, in one embodiment, a label is provided in conjunction with the PVT solution. For example, the hybrid solution module may produce a position fix including PVT with the label "HYBRID OUTPUT", "HYBRID OUTPUT: Lower accuracy", "HYBRID OUTPUT LOW ACCURACY" or some other appropriate label.

In addition, in one embodiment, pseudorange data generated by both HA and HY modules are passed to the hybrid module where a hybrid position is generated. In one embodiment, carrier phase data or other relevant information regarding carrier phase is also passed to the hybrid module. In general, the carrier phase data or other relevant information regarding carrier phase may be used to provide smoothing of pseudorange data, whereby random variations are diminished or filtered, to provide a less noisy signal.

In one embodiment, pseudorange, doppler, position, velocity, and timing information may be passed directly from the HY module to the HA module to assist in (re)acquisition of signals tracked by the HY module but not the HA module. This information may enable the HA module to track signals quicker than possible without the assisting information. Alternatively, the position, velocity, time, and measurement information may be passed from the hybrid module back to either or both the HA and HY modules.

A position fix determined by a hybrid set of HA and HY pseudoranges will have a calculable position accuracy associated with it. That is, the estimated position accuracy is computed as part of the PVT estimation process when using least squares of Kalman filtering. It makes use of the input weights (measurement variances).The accuracy of this hybrid pseudorange solution can be compared to a previously determined accuracy for High Accuracy Only solutions, and to High Yield Only solutions. This information is available for use in determining if the data being taken is adequate for the current application.

For example, the hybrid module 110 may be used to compare measurements that are common to the HA and HY modules. This comparison can be used to generate quality information for the measurements. For example, if there is a large discrepancy between the HA and HY measurements to a given satellite, it may be assumed that there is multipath on one or both of the measurements. This measurement may then be deweighted relative to the other measurements used in the position fix. Similar treatment of the doppler measurements may also be done. One could also maintain the difference between the HA and HY measurements. If the HA measurement later becomes unavailable, this difference could then be applied to the HY measurement in an attempt to increase the accuracy of the HY measurement. Further discussion of deweighted measurement is provided in the bias filter section.

In one embodiment, user input is optionally provided. For example, user input may be a pseudorange accuracy minimum allowable tolerance, or the like. In one embodiment, if the user input requests an accuracy minimum allowable tolerance that is greater than the present accuracy of NSS Pseudorange hybrid solution, no hybrid location solution 165 will be provided. However, if the user input requests a minimum allowable tolerance that is less than the present accuracy of NSS Pseudorange hybrid solution, then hybrid position fix output 165 will be provided.

In one embodiment, an error notification may be provided when a currently available number of pseudoranges for the high accuracy location solution are less than a selected availability number. For example, a user may select the availability number with user-accessible slider having integer settings such as 0-8.

In yet another embodiment, the error notification new number may be provided when an estimated location accuracy of the hybrid NSS-based location is less than a selected minimum accuracy. For example, the selected minimum accuracy may be a system default or may be user input such as with a user-accessible slider having accuracy settings.

In one embodiment, if only the HA module 120 is providing a solution, the HY module 130 may cycle off to allow power saving capabilities for the NSS Pseudorange hybridization 110. For example, if the HY module 120 is tracking <4 satellites then the HA receiver may be disabled to save power. However, in another embodiment, the HA module 130 may remain active to maintain bias filters and the like.

Thus, the NSS Pseudorange hybrid module 110 provides combined performance, functionality, and integrity that may not be available in either stand-alone HY module 130 or HA module 120. For example, even when HA module 120 is unable to provide a high accuracy location solution, the pseudorange information provided by the HA module 130 may significantly increase the accuracy of the high yield location solution generated by HY module 130.

Bias Filter

When the receiver boots and generates its first PVT solution, set the array of Biases to 0.

While ($n=0$; $n$<NUM_OF_SVS; $n$++) Bias($n$)=0;

At each epoch:
1. For all SVs tracking both an HA and an HY pseudorange, calculate and set the 'Bias' between the HA(p) and HY(p):

Bias($n$)=HA($n,p$)−HY($n,p$)$n$=SV number;
$p$=pseudorange

2. For all SVs that are tracking an HY pseudorange (and may or may not be tracking an HA pseudorange), form the adjusted pseudorange:

AP($n$)=HY($n,p$)+Bias($p$) AP=Adjusted Pseudorange

Note that if the HA pseudorange exists; the AP is set to it. If not, then the AP is set to the HY pseudorange+the corresponding bias from the previous epoch.

3. Form the PVT Calculation in the normal way using the AP pseudoranges of (2).

4. Decrease (decay) the value of each Bias per the equation:

While ($n=0$; $n$<NUM_OF_SVS; $n$++)
Bias($n$)=Decay_Factor*Bias($n$);

Where 'Decay_Factor' is user settable between 0 and 1, generally in the range of 0.7 to 0.95.

Thus, in one embodiment, the bias filter relies on the fact that an HA pseudorange (HA(p)) is more accurate than the corresponding HY(p), and when the HA(p) is available it is used. Moreover, when the HA(p) is not available (e.g., drops out) an adjusted version of the HY(p) is used—the adjusted value being equal to the most recently known value of the HA(p) plus the accumulated change in the HY(p) during the time the HA(p) has not been available. Or more simply: HY(n,p)+Bias(n)

The above description is complete if the Decay_Factor is set to 1.0. For non 1 values (no decay), the adjustment decreases with time to reflect the reality that the approach is an approximation of reality that decreases in effectiveness with the increase in the time in which HA(p) is unknown.

Figure 6:
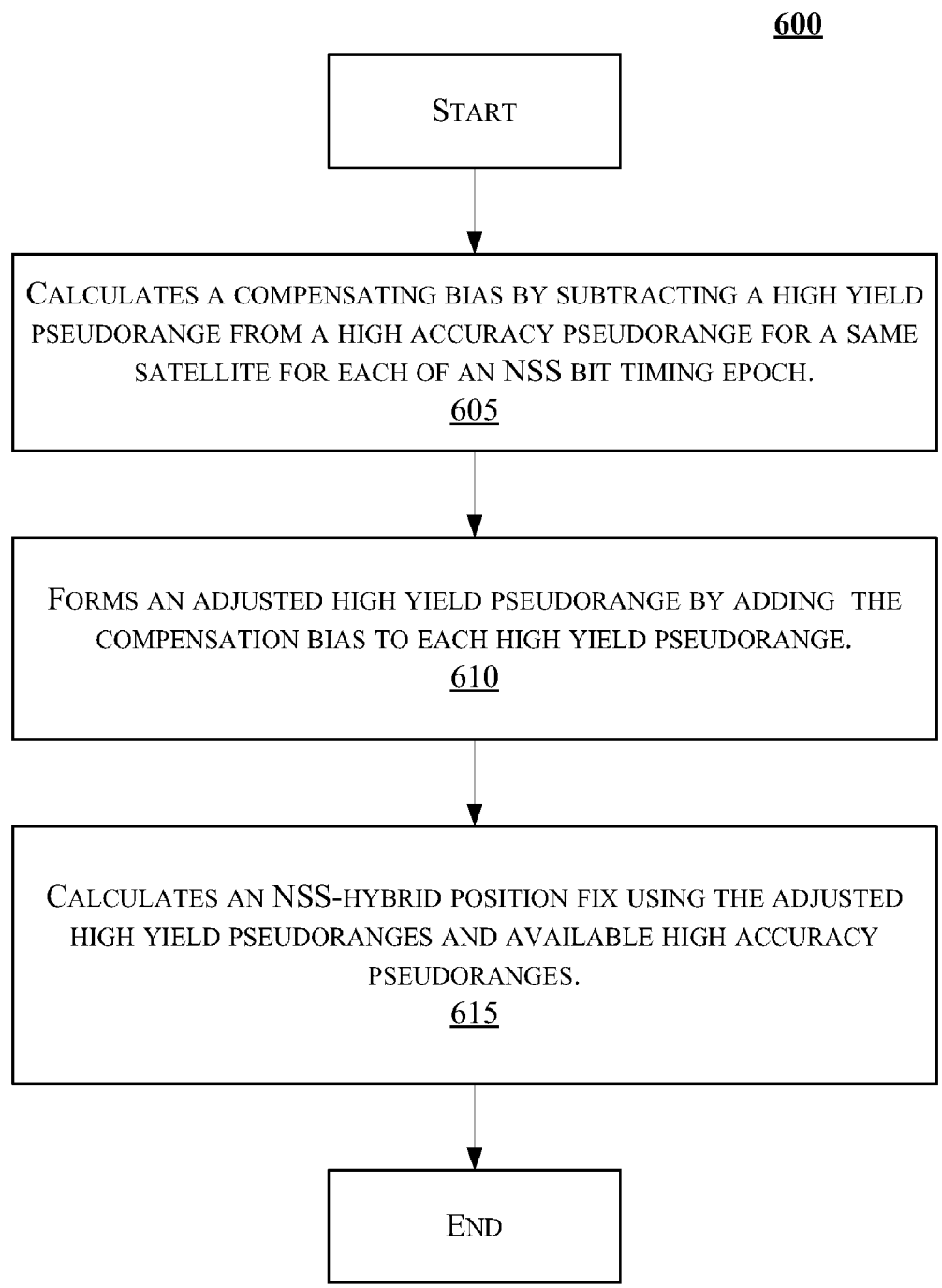
FIG. 6 is a flow chart of a method for utilizing a bias adjustment when generating a hybrid position fix in accordance with one embodiment of the present invention.

With reference now to FIG. 6, a flow chart of a method for utilizing a bias adjustment when generating a hybrid position fix is shown in accordance with one embodiment of the present invention.

At 605, one embodiment calculates a compensating bias by subtracting the high yield pseudorange from the high accuracy pseudorange for the same satellite for each of an NSS bit timing epoch. At 610, one embodiment forms an adjusted high yield pseudorange by adding the compensation bias to each high yield pseudorange. At 615, one embodiment calculates the NSS-hybrid position fix using the adjusted high yield pseudoranges and available high accuracy pseudoranges.

For example, the difference between the high accuracy pseudorange and the high yield pseudorange is calculated for a given satellite at each GPS bit timing epoch, such as 20 msec. This difference, called a "bias," is used to create a short-term adjustment to the HY pseudorange, as shown in the formula for the adjusted HY(p) above. This adjusted HY(p) is then used to feed the NSS-Hybrid solution calculator, at each time of calculation. Therefore, in one embodiment, when HA(p) is available, the adjusted HY(p) is equal to the HA(p), thereby giving the best pseudorange available to the hybrid solution calculator. However, if the HA(p) drops out, then the adjusted HY(p) is used, with an expected improved accuracy of HY(p).

In another embodiment, if the HA(p) is unavailable for more than a few bit timing epochs, the bias is likely to become erroneous due to satellite motion. To reduce this effect, the bias correction is diminished by applying a reduction factor, on the order of 0.5 to 0.7, to each bias value in successive bit timing epochs, so that after a few more epochs, the unbiased HY becomes the Adjusted HY being input to the NSS-Hybrid position calculator.

Example Computing System

Figure 7:
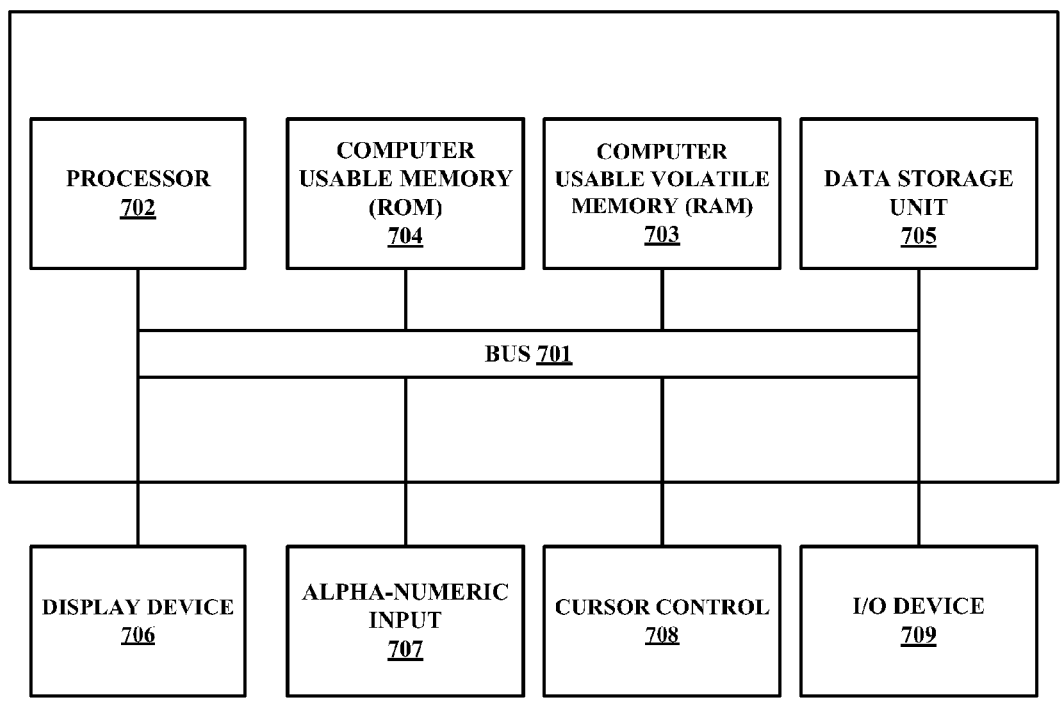
FIG. 7 is a block diagram of a computer system in accordance with an embodiment of the present invention.

Referring now to FIG. 7, a diagram of computer system 700 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 700 and executed by processor 702 of system 700. When executed, the instructions cause the computer system 700 to perform specific functions and exhibit specific behavior as described.

In general, computer system 700 used by the embodiments of the present invention comprises an address/data bus 701 for communicating information, one or more central processors 702 coupled with the bus 701 for processing information and instructions, a computer readable volatile memory unit 703 (e.g., random access memory, static RAM, dynamic, RAM, etc.) coupled with the bus 701 for storing information and instructions for the central processor(s) 702, a computer readable non-volatile memory unit 704 (e.g., read only memory, programmable ROM, flash memory, EPROM, EEPROM, etc.) coupled with the bus 701 for storing static information and instructions for the processor(s) 702.

System 700 also includes a mass storage computer readable data storage device 705 such as a magnetic or optical disk and disk drive coupled with the bus 701 for storing information and instructions. Optionally, system 700 can include a display device 706 coupled to the bus 701 for displaying information to the computer user (e.g., maintenance technician, etc.), an alphanumeric input device 707 including alphanumeric and function keys coupled to the bus 701 for communicating information and command selections to the central processor(s) 702, a cursor control device 708 coupled to the bus for communicating user input information and command selections to the central processor(s) 702, and a signal generating input/output device 709 coupled to the bus 701 for communicating command selections to the processor(s) 702.

Example GNSS Receiver

Figure 8:
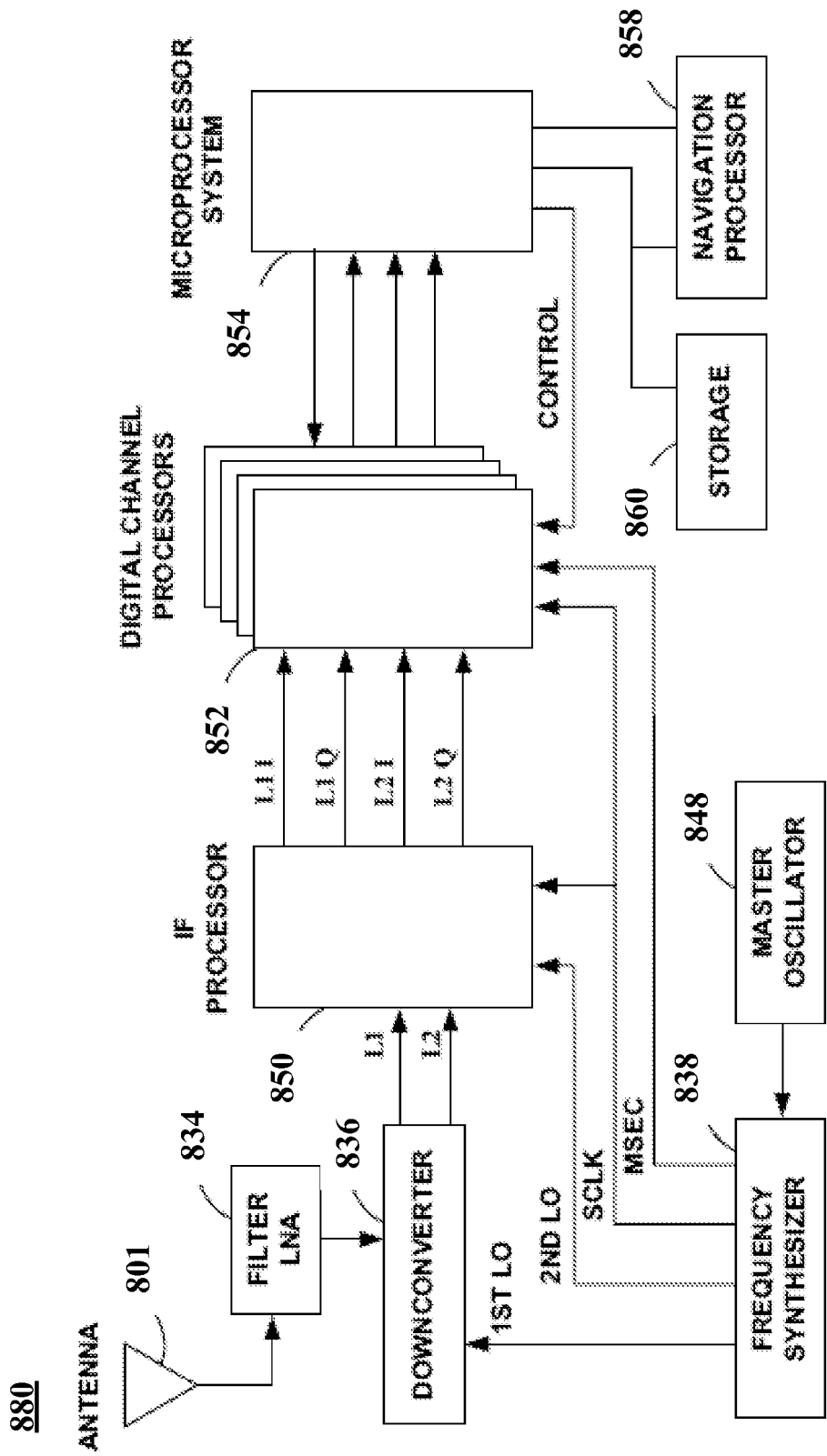
FIG. 8 is a block diagram of an example NSS receiver which may be used in accordance with an embodiment of the present invention.

With reference now to FIG. 8, a block diagram is shown of an embodiment of an example GNSS receiver which may be used in accordance with various embodiments described herein. In particular, FIG. 8 illustrates a block diagram of a GNSS receiver in the form of a general purpose GPS receiver 880 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 880 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 880 of FIG. 8.

In FIG. 8, received L1 and L2 signal is generated by at least one GPS satellite. Each GPS satellite generates different signal L1 and L2 signals and they are processed by different digital channel processors 852 which operate in the same way as one another. FIG. 8 shows GPS signals (L1=1575.42 MHz, L2=1227.60 MHz) entering GPS receiver 880 through a dual frequency antenna 801. Antenna 801 may be a magnetically mountable model commercially available from Trimble® Navigation of Sunnyvale, Calif., 94085. Master oscillator 848 provides the reference oscillator which drives all other clocks in the system. Frequency synthesizer 838 takes the output of master oscillator 848 and generates important clock and local oscillator frequencies used throughout the system. For example, in one embodiment frequency synthesizer 838 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 834 performs filtering and low noise amplification of both L1 and L2 signals. The noise figure of GPS receiver 880 is dictated by the performance of the filter/LNA combination. The downconverter 836 mixes both L1 and L2 signals in frequency down to approximately 175 MHz and outputs the analogue L1 and L2 signals into an IF (intermediate frequency) processor 30. IF processor 850 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 852 inputs the digitally sampled L1 and L2 inphase and quadrature signals. All digital channel processors 852 are typically are identical by design and typically operate on identical input samples. Each digital channel processor 852 is designed to digitally track the L1 and L2 signals produced by one satellite by tracking code and carrier signals and to form code and carrier phase measurements in conjunction with the microprocessor system 854. One digital channel processor 852 is capable of tracking one satellite in both L1 and L2 channels.

Microprocessor system 854 is a general purpose computing device which facilitates tracking and measurements processes, providing pseudorange and carrier phase measurements for a navigation processor 858. In one embodiment, microprocessor system 854 provides signals to control the operation of one or more digital channel processors 852. Navigation processor 858 performs the higher level function of combining measurements in such a way as to produce position, velocity and time information for the differential and surveying functions. Storage 860 is coupled with navigation processor 858 and microprocessor system 854. It is appreciated that storage 860 may comprise a volatile or non-volatile storage such as a RAM or ROM, or some other computer readable memory device or media.

One example of a GPS chipset upon which embodiments of the present technology may be implemented is the Copernicus™ chipset which is commercially available from Trimble® Navigation of Sunnyvale, Calif., 94085. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112.

Thus, embodiments described herein provide a position fix when only high accuracy fixes may not be possible. Moreover, Embodiments described herein provide position fixes with variable accuracy and variable times to achieve said accuracy. Embodiments further provide signal acquisition aiding information from a high yield receiver to a high accuracy receiver to speed acquisition. Embodiments additionally provide an accuracy metric label based on kind and degree of hybridization.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application. It is intended that the scope of the invention be defined by the Claims appended hereto and their equivalents.

What is claimed is:

1. A method for hybrid position determination, comprising:
   receiving navigation satellite system (NSS) pseudorange data from a first GNSS receiver configured to provide high yield pseudoranges;
   receiving NSS pseudorange data from a second GNSS receiver configured to provide high accuracy pseudoranges; and
   utilizing the high accuracy pseudoranges and selected ones of the high yield pseudoranges at a hybrid PVT processor to determine a hybrid NSS-based location solution.

2. The method of claim 1, wherein the step of utilizing includes:
   using only the high accuracy pseudoranges for determining the NSS-based location when a sufficient number of the high accuracy pseudoranges are currently available; and
   using one or more high yield pseudoranges with the high accuracy pseudoranges for determining the NSS-based location when an insufficient number of the high accuracy pseudoranges are currently available.

3. The method of claim 1, wherein the hybrid NSS-based location solution comprises:
   estimating a basic location accuracy using a high accuracy pseudorange set of the high accuracy pseudoranges;
   estimating an augmented location accuracy using an augmented pseudorange set of the high accuracy pseudoranges augmented with at least one of the high yield pseudoranges; and
   using the basic or augmented pseudorange set for determining the hybrid NSS-based location solution according to the better of the basic or augmented location accuracy.

4. The method of claim 1, wherein the hybrid NSS-based location solution comprises:
   estimating a first location accuracy using a first pseudorange set having the high accuracy pseudoranges and a first of the high yield pseudoranges;
   estimating a second location accuracy using a second pseudorange set having the high accuracy pseudoranges and a second of the high yield pseudoranges; and
   using the first or second pseudorange set for determining the hybrid NSS-based location solution according to the better of the first or second location accuracy.

5. The method of claim 4, wherein the step of estimating the first location accuracy includes:
   estimating basic pseudorange accuracies of the high accuracy pseudoranges, respective;
   estimating a first pseudorange accuracy of the first high yield pseudorange; and
   determining the first location accuracy based on the accuracy estimates for the first pseudorange set.

6. The method of claim 5, wherein the step of estimating the first location accuracy includes:
   calculating a dilution of precision (DOP) for NSS satellites corresponding to the first pseudorange set; and
   estimating the first location accuracy based on the DOP and the estimated pseudorange accuracies for the first pseudorange set.

7. The method of claim 5, wherein the step of estimating the first pseudorange accuracy comprises:
   estimating the first pseudorange accuracy based at least in part on a signal-to-noise ratio for a NSS signal corresponding to the first high yield pseudorange.

8. The method of claim 5, wherein the step of estimating the first pseudorange accuracy comprises:
   estimating the first pseudorange accuracy based at least in part on an elevation angle for a NSS satellite corresponding to the first high yield pseudorange.

9. The method of claim 5, wherein the step of estimating the first pseudorange accuracy comprises:
   estimating the first pseudorange accuracy based at least in part on a length of time tracking a NSS signal corresponding to the first high yield pseudorange.

10. The method of claim 1, further comprising:
    issuing a notification when an estimated location accuracy of the hybrid NSS-based location solution is less than a selected minimum accuracy.

11. The method of claim 10 wherein:
    selecting the selected minimum accuracy with user-accessible slider having accuracy settings.

12. The method of claim 1, further comprising:
    issuing a notification when a currently available number of the high accuracy pseudoranges is less than a selected availability number; and
    issuing a notification based on a dilution of precision (DOP) threshold.

13. The method of claim 12, wherein:
selecting the availability number with user-accessible slider having integer settings.

14. The method of claim 12, wherein: the availability number is selectable for at least two of the following numbers: zero, one, two, three, four, five, six, seven and eight.

15. The method of claim 1, further comprising:
determining pseudorange differences comprising:
subtracting a high accuracy pseudorange from a high yield pseudorange for the same NSS satellite, in the same bit time period to generate a pseudorange difference;
repeating the subtracting for each additional in-view NSS satellite, to create a set of pseudorange differences;
utilizing the absolute value of each the pseudorange difference in the set of pseudorange differences to generate a set of pseudorange deltas ordered from smallest to largest;
inputting the high yield pseudorange with the smallest pseudorange delta to a hybrid NSS-based solution;
evaluating a position dilution of precision threshold for the hybrid NSS-based solution; and
repeating the inputting and evaluating for each high yield pseudorange in the order defined by the set of pseudorange deltas until a position dilution of precision threshold for the hybrid NSS-based solution is met.

16. The method of claim 1, further comprising:
receiving NSS signal acquisition data from a high yield NSS receiver for a first NSS satellite corresponding to a first of the high yield pseudoranges; and
using the signal acquisition data in a high accuracy NSS receiver for acquiring a NSS signal from the first NSS satellite for determining a first of the high accuracy pseudoranges.

17. The method of claim 16, wherein the signal acquisition data includes signal acquisition data that HY can pass to HA for acquisition or re-acquisition of HA pseudoranges selected from the group consisting of: Doppler, velocity, time, code phase, NSS clock, clock drift, and PRN number.

18. The method of claim 16, wherein: the positioning data includes signal acquisition data that HY can pass to HA for acquire or re-acquire selected from the group consisting essentially of: Doppler, velocity, time and code phase.

19. The method of claim 1, further comprising:
using a high accuracy technique for determining the high accuracy pseudoranges and using a high yield technique for determining the high yield pseudoranges; wherein:
the high accuracy technique differs from the high yield technique for determining pseudoranges selected from the group of techniques consisting of: a de-weighting pseudoranges corresponding to NSS satellites having elevation angles below an elevation threshold, a tracking state and a loop bandwidth.

20. The method of claim 1, further comprising:
using a high accuracy technique for determining the high accuracy pseudoranges and using a high yield technique for determining the high yield pseudoranges; wherein:
the high yield technique differs from the high accuracy technique by using NSS satellite signals having a lower signal-to-noise ratio for determining the high yield pseudoranges.

21. A navigation satellite system (NSS) position determination system comprising:

a NSS high accuracy module for determining a high accuracy pseudorange solution based on a portion of a positioning signal;
a NSS high yield module for determining a high yield pseudorange solution based on said positioning signal;
a hybrid solution module for receiving pseudorange input from both the NSS high accuracy module and the NSS high yield module, the hybrid solution module providing a hybrid pseudorange solution; and
a position provider outputting the hybrid pseudorange solution to said NSS high accuracy module and said NSS high yield module.

22. The system of claim 21 wherein said NSS is a global navigation satellite system (GNSS) position determination system.

23. The system of claim 21 wherein said NSS is a local navigation satellite system (LNSS) position determination system.

24. The system of claim 21 wherein said hybrid pseudorange solution further comprises an estimated pseudorange accuracy based at least in part on a signal-to-noise ratio for a NSS signal corresponding to the first high yield pseudorange.

25. The system of claim 21 wherein said hybrid pseudorange solution further comprises an estimated pseudorange accuracy corresponding to the first high yield pseudorange based at least in part on the group of NSS signal factors consisting of: a length of time tracking a NSS signal, a tracking state and a loop bandwidth.

26. The system of claim 21 wherein said hybrid pseudorange solution further comprises an estimated pseudorange accuracy based at least in part on an elevation angle for a NSS satellite corresponding to the first high yield pseudorange.

27. The system of claim 21 further comprising:
a multipath discriminator module for receiving and comparing a pseudorange input from both the NSS high yield module and the NSS high accuracy module; and
a multipath discriminator module for removing the pseudorange input from the NSS high yield module with the pseudorange input from the NSS high accuracy module at the hybrid solution module when the comparing results are below a correlation percentage threshold.

28. The system of claim 21 wherein the positioning signal is selected from the group of NSS providers comprising: a global positioning system (GPS) signal, a Galileo signal, a Globalnaya Navigatsionnay Sputnikovaya Sistema (GLONASS) signal, and a Compass signal.

29. A method for providing a bias adjustment when generating a hybrid navigation satellite system (NSS) position fix, said method comprising:
calculating a compensating bias by subtracting a high yield pseudorange from a high accuracy pseudorange for a same satellite for each of an NSS bit timing epoch;
forming an adjusted high yield pseudorange by adding the compensation bias to each high yield pseudorange;
calculating an NSS-hybrid position fix using said adjusted high yield pseudoranges and available high accuracy pseudoranges.

30. The method of claim 29, further comprising:
applying an aging/reduction factor to reduce the magnitude of the compensating bias for each of said adjusted high yield pseudorange, in a subsequent NSS bit timing epoch for which a corresponding high accuracy pseudorange is not available.

* * * * *